(12) United States Patent
Tsubone (10) Patent No.: US 9,587,600 B2
(45) Date of Patent: Mar. 7, 2017

(54) AIR INTAKE DEVICE FOR MOTORCYCLE

(71) Applicant: Kawasaki Jukogyo Kabushiki Kaisha, Kobe-shi, Hyogo (JP)

(72) Inventor: Toshiyuki Tsubone, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 14/887,190

(22) Filed: Oct. 19, 2015

(65) Prior Publication Data

US 2016/0040637 A1 Feb. 11, 2016

Related U.S. Application Data (63) Continuation of application No. PCT/JP2014/061415, filed on Apr. 23, 2014.

(30) Foreign Application Priority Data

May 17, 2013 (JP) .................................. 2013-105144

(51) Int. Cl.
*B62D 61/02* (2006.01)
*F02M 35/16* (2006.01)
(Continued)

(52) U.S. Cl.
CPC ........... *F02M 35/162* (2013.01); *B62K 11/04* (2013.01); *F02M 35/048* (2013.01);
(Continued)

(58) Field of Classification Search
None
See application file for complete search history.

(56) References Cited

U.S. PATENT DOCUMENTS 4,597,466 A * 7/1986 Yamada ................... B62J 17/00
180/215
6,409,783 B1 * 6/2002 Miyajima .............. F02M 35/04
123/198 E (Continued)

FOREIGN PATENT DOCUMENTS

EP 2520782 11/2012
JP 06-221238 8/1994

(Continued)

OTHER PUBLICATIONS

International Search Report for PCT/JP2014/061415, filed Apr. 23, 2014.

(Continued)

*Primary Examiner* — Tony Winner (57) ABSTRACT

In an air intake device for motorcycle, an air cleaner having a front end formed with a main intake port is disposed between a pair of left and right main frame pieces forming a main frame. An introducing passage is formed within the main frame for capturing an incoming wind. An intake air introducing port of the introducing passage is provided at a location rearwardly of the main intake port in the main frame piece. An intake air discharge port is defined in an intermediate portion of a front portion of the main frame with respect to a motorcycle widthwise direction so as to open rearwardly and to be fluid connected with the main intake port. A sub intake port is provided in communication with the main intake port so as to introduce an intake air into the main intake port.

4 Claims, 6 Drawing Sheets

(51) Int. Cl.
*B62K 11/04* (2006.01)
*F02M 35/04* (2006.01)
*F02M 35/10* (2006.01)

(52) U.S. Cl.
CPC *F02M 35/10013* (2013.01); *F02M 35/10321* (2013.01); *F02M 35/10124* (2013.01); *F02M 35/10144* (2013.01)

(56) References Cited

U.S. PATENT DOCUMENTS

| | | | | |
|---|---|---|---|---|
| 7,264,072 | B2* | 9/2007 | Yoshikawa | F02M 35/04 123/184.21 |
| 8,151,754 | B2 | 4/2012 | Matsuda et al. | |
| 8,418,791 | B2 | 4/2013 | Matsuda et al. | |
| 8,646,438 | B2 | 2/2014 | Saeki et al. | |
| 2005/0051375 | A1* | 3/2005 | Momosaki | F02M 35/10013 180/219 |
| 2005/0178598 | A1* | 8/2005 | Arnold | B62J 17/00 180/229 |
| 2009/0008178 | A1* | 1/2009 | Buell | B62J 35/00 180/225 |
| 2009/0218152 | A1 | 9/2009 | Oohashi et al. | |
| 2010/0108010 | A1 | 5/2010 | Matsuda et al. | |
| 2011/0155086 | A1 | 6/2011 | Matsuda et al. | |
| 2011/0155492 | A1 | 6/2011 | Matsuda et al. | |
| 2012/0260896 | A1 | 10/2012 | Saeki et al. | |

FOREIGN PATENT DOCUMENTS

| | | |
|---|---|---|
| JP | 08-053093 | 2/1996 |
| JP | 2002-205677 | 7/2002 |
| JP | 2006-063907 | 3/2006 |
| JP | 2010-071111 | 4/2010 |
| JP | 2010-264832 | 11/2010 |
| JP | 2011-012609 | 1/2011 |
| JP | 2011-137431 | 7/2011 |
| JP | 2011-230649 | 11/2011 |
| JP | 2012-206694 | 10/2012 |

OTHER PUBLICATIONS

English Translation of the International Preliminary Report on Patentability and Written Opinion of the International Searching Authority mailed Nov. 26, 2015 for International PCT Patent Application No. PCT/JP2014/0614159, filed Apr. 23, 2014 (11 pages).

Notification of Reason(s) for Rejection Issued Nov. 1, 2016 for Corresponding Japanese Patent Application No. 2013-105144 with English language Summary (4 pages).

Extended and Supplementary Search Report Issued Jan. 3, 2017 for Corresponding European Patent Application No. 14798115.3 (8 pages).

* cited by examiner

AIR INTAKE DEVICE FOR MOTORCYCLE

CROSS REFERENCE TO THE RELATED APPLICATION

This application is a continuation application, under 35 U.S.C §111(a) of international application No. PCT/JP2014/061415, filed Apr. 23, 2014, which claims priority to Japanese patent application No. 2013-105144, filed May 17, 2013, the entire disclosure of which is herein incorporated by reference as a part of this application.

BACKGROUND OF THE INVENTION

Field of the Invention

The present invention relates to an air intake device for a motorcycle in which an air intake sound is reduced and an engine performance is improved.

Description of Related Art

The patent document 1 listed below, for example, discloses a conventional air intake device for a motorcycle of a design in which air is introduced from an air intake port into a motorcycle frame structure and then, an air is introduced into an air cleaner main body through an intake port communicated with an intake air discharge port in the motorcycle frame structure.

PRIOR ART LITERATURE

Patent Document 1: JP Laid-open Patent Publication No. 2011-137431

It has, however, been found that, according to the above mentioned conventional technique, since the air intake port of the air cleaner has a limited open area, the conventional technique is unable to meet sufficiently the recent demands to increase the air intake efficiency and to increase the engine performance. Although it may be contemplated to increase the air intake efficiency by increasing the open area of the intake port of the air cleaner, the increase of the open area of the intake port of the air cleaner necessitates a concomitant increase of the open area of the intake air discharge port in the motorcycle frame structure that is in communication with the intake port of the air cleaner and, hence, the rigidity of the motorcycle frame structure is adversely affected.

SUMMARY OF THE INVENTION

In view of foregoing, the present invention has been devised to provide a motorcycle air intake device in which the air intake efficiency is increased to increase the engine performance and to improve the acoustic quality of sounds of air being introduced.

In order to accomplish the foregoing object, a motorcycle air intake device in accordance with the present invention includes: an air cleaner having an front end formed with a main intake port, the air cleaner being positioned between a pair of left and right main frame pieces forming a main frame; introducing passage defined within the main frame to capture an incoming wind as an engine intake air; an intake air introducing port of the introducing passage provided in a portion of the main frame piece at a location rearwardly of the main intake port in the air cleaner; an intake air discharge port defined in an intermediate portion of a front portion of the main frame with respect to a motorcycle widthwise direction, the intake air discharge port being opened rearwardly and fluid connected with the main intake port; and a sub intake port provided in communication with the main intake port to introduce an intake air from a location in the vicinity of the main intake port into the main intake port.

According to the present invention, the incoming air taken from the intake air introducing port in the main frame as an engine intake air is supplied from the main intake port in the air cleaner into the air cleaner that is fluid connected with the intake air discharge port in the main frame. At this time, the introducing port of the introducing passage referred to above is defined in a portion of the main frame piece, which is situated rearwardly of the main intake port of the air cleaner, and the intermediate portion of the front portion of the main frame with respect to the motorcycle widthwise direction is formed with the intake air discharge port that is opened rearwardly and fluid connected with the main intake port. Therefore, the introducing passage within the main frame is increased in length and, accordingly, intake air sounds are reduced. Also, since the intake air is also introduced from the sub intake port into the main intake port, the surface area of the intake port is substantially increased. Accordingly, the amount of air sucked into the air cleaner is increased to thereby increase the air intake efficiency, resulting in an increase of the engine performance. Furthermore, since the main frame itself can be used with the conventional parts in the form as they are, the manufacturing cost can be suppressed to a low cost.

In a preferred embodiment of the present invention, the sub intake port is preferably disposed on a lower side of the main intake port. This structural feature makes it possible to avoid an undesirable intrusion of rain into the sub intake port.

In another preferred embodiment of the present invention, the air cleaner preferably has a tip end having an intake duct in which the main intake port is formed, and the intake duct has a peripheral wall provided with a cutout portion, which is provided with the sub intake port. According to this structural feature, the sub intake port can be formed with a simplified structure merely by cutting out a peripheral wall of the intake duct.

In a further preferred embodiment of the present invention, the intake duct preferably has a tip end portion fluid connected with the intake air discharge port through a connecting ring made of an elastic material, in which case the connecting ring is provided with a guide portion that protrude downwardly and forwardly from the main intake port to introduce the intake air into the sub intake port. According to this structural feature, merely by mounting the connecting ring, which is made of the elastic material, on the intake duct, the sub intake port can be easily formed by a combination of the guide portion of the connecting ring and the cutout portion in the intake duct. The air cleaner and the main frame are connected together by means of the connecting ring made of the elastic material, and therefore, air tightness is secured, whereby upward and lateral leakage of intake sounds can be reduced.

In a still further referred embodiment of the present invention, the connecting ring is preferably mounted on an outer periphery of the tip end portion of the intake duct and has a pawl portion engageable with an outer wall surface in the vicinity of the intake air discharge port in the main frame. According to this structural feature, when the front portion of the main frame and the tip end of the intake duct are connected together through the connecting ring, the connecting ring is connected with the main frame in a stable fashion by means of the pawls in the connecting ring.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
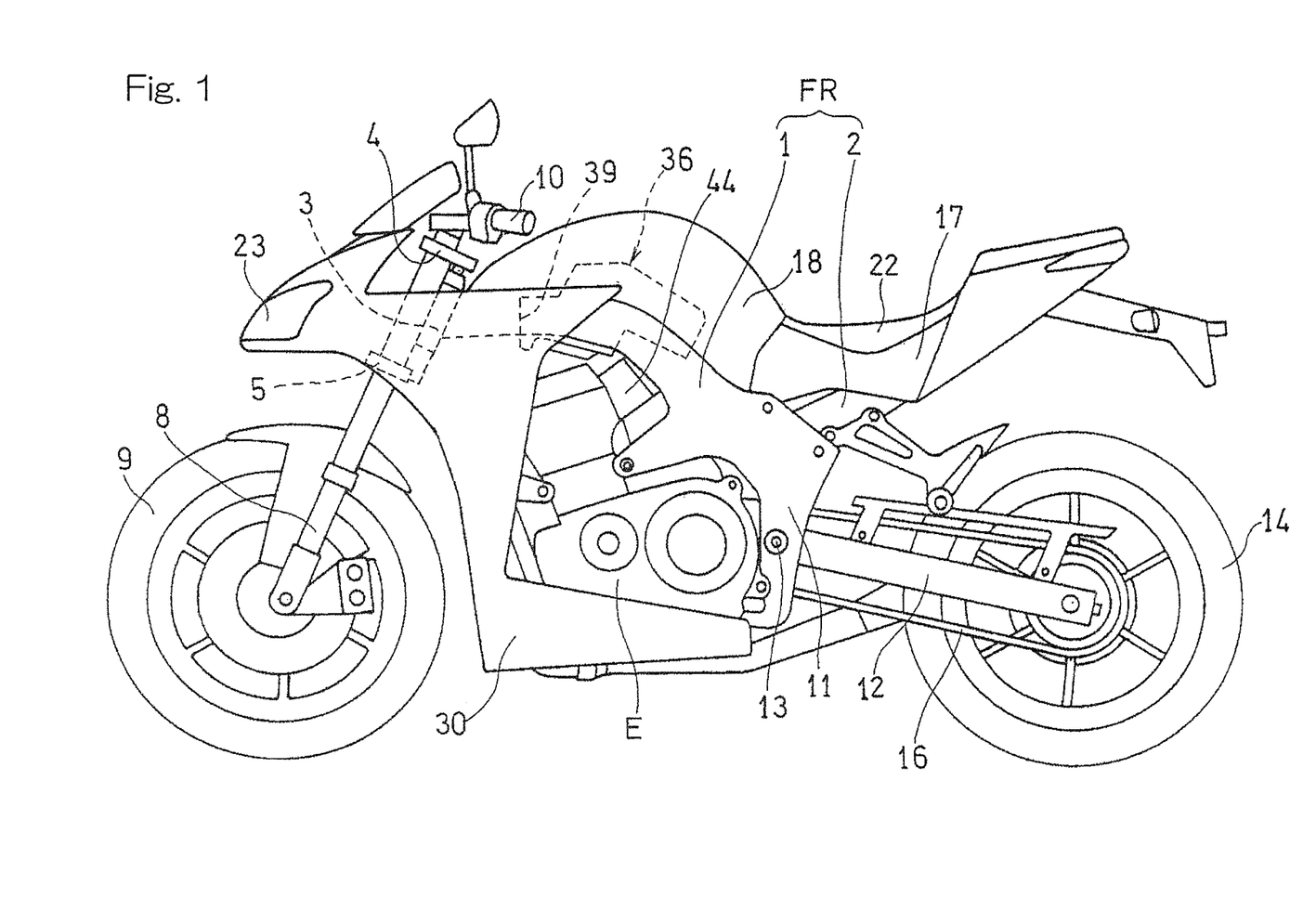
FIG. 1 is a schematic side view showing a motorcycle equipped with an air intake device designed in accordance with a preferred embodiment of the present invention.

Hereinafter, a preferred embodiment of the present invention will be described in detail with particular reference to the accompanying drawings. FIG. 1 illustrates a schematic side view of a motorcycle equipped with an air intake device designed in accordance with a preferred embodiment of the present invention. The illustrated motorcycle has a motorcycle frame structure FR which includes a main frame 1, forming a front half unit thereof, and a rear frame 2 connected with a rear portion of the main frame 1 and forming a rear half unit thereof. A head pipe 3 is fitted to a front end portion of the main frame 1; an upper bracket 4 and an under bracket 5 are fitted to a steering shaft (not shown) that is rotatably inserted in the head pipe 3. A front fork 8 is supported by the upper bracket 4 and the under bracket 5, and a front wheel 9 is supported by a lower end portion of the front fork 8. A handlebar 10 is fitted to the upper bracket 4 at an upper end portion of the front fork 8.

A swingarm bracket 11 is provided in a rear end portion of the main frame 1, and a swingarm 12 is supported by the swingarm bracket 11 through a pivot pin 13, inserted in a front end portion of the swingarm 12, for swinging movement up and down. A rear wheel 14 is supported by a rear end portion of the swingarm 12. A combustion engine E is supported by a lower portion of the main frame 1, and the combustion engine E drives the rear wheel 14 through a power transmission mechanism 16 such as, for example, a drive chain. The combustion engine E employed in the practice of this embodiment is, for example, a four cylinder, four cycle water-cooling engine.

A rider's seat 22 is supported by the rear frame 2, and a fuel tank 18 is fitted to an upper portion of the main frame 1, that is, to an upper portion of a motorcycle body and between the handlebar 10 and the rider's seat 22. A region beneath the rider's seat 22 is laterally covered by a side covering 17. A large sized front fairing 30 enough to cover a large region ranging from a front end portion of the motorcycle body to a location laterally of the combustion engine E is mounted on a motorcycle front portion, and a headlamp unit 23 is mounted on the front fairing 30. An air cleaner 36 is disposed in the vicinity of the rear portion of the head pipe 3.

Figure 2:
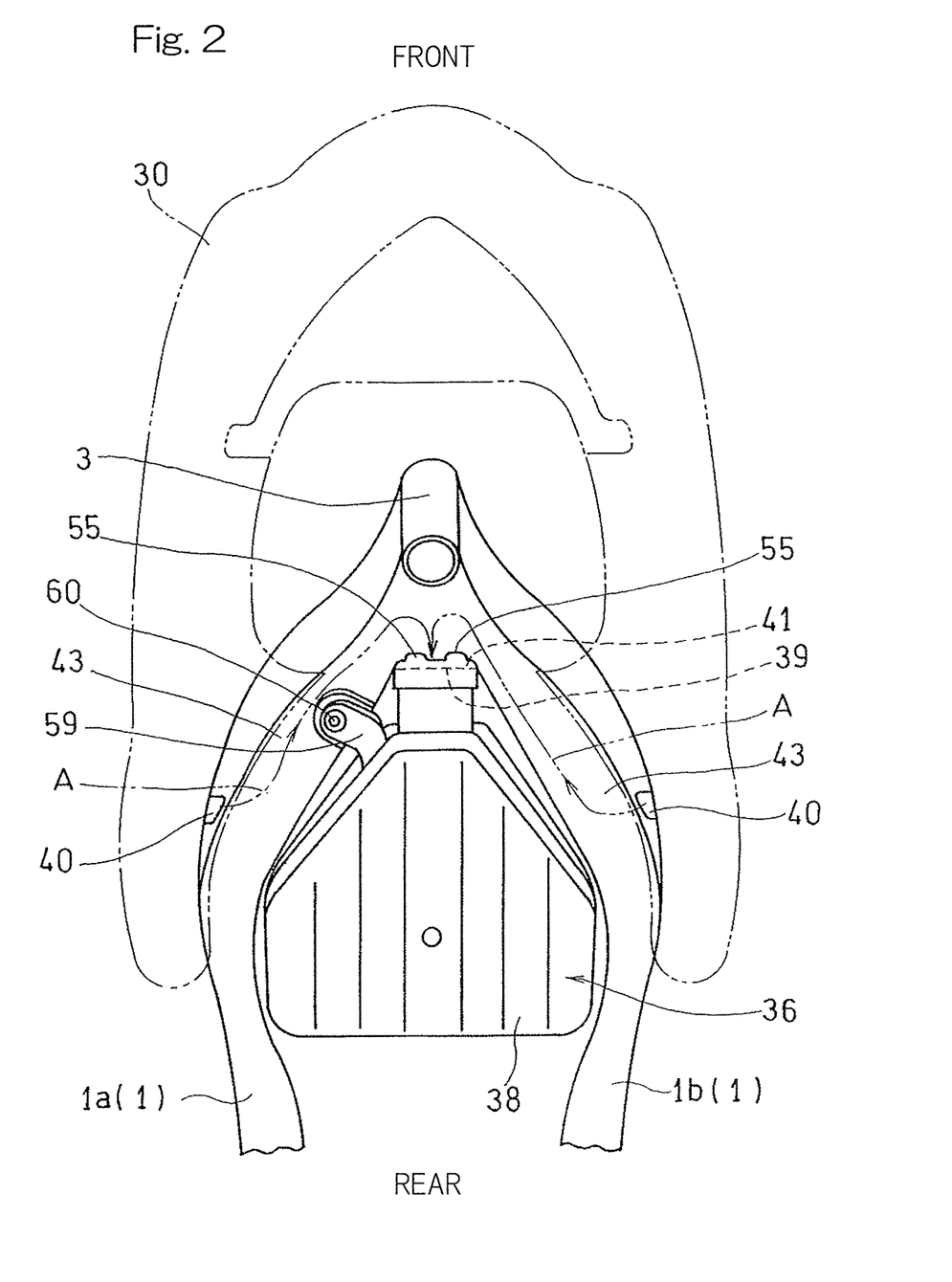
FIG. 2 is a schematic fragmentary top plan view showing, on an enlarged scale, the air intake device and its vicinity.

As shown in FIG. 2, the main frame 1 includes a pair of left and right main frame pieces 1a and 1b. The air cleaner 36 is positioned between the frame pieces 1a and 1b and in the vicinity of the rear portion of the head pipe 3. A front portion of the air cleaner 36 is supported by the main frame 1 by means of a connecting member 60 such as, for example, a bolt through a tank bracket 59 as will be detained later. A rear portion of the air cleaner 36 is supported by a throttle body 44 of the combustion engine E shown in FIG. 1.

Figure 3:
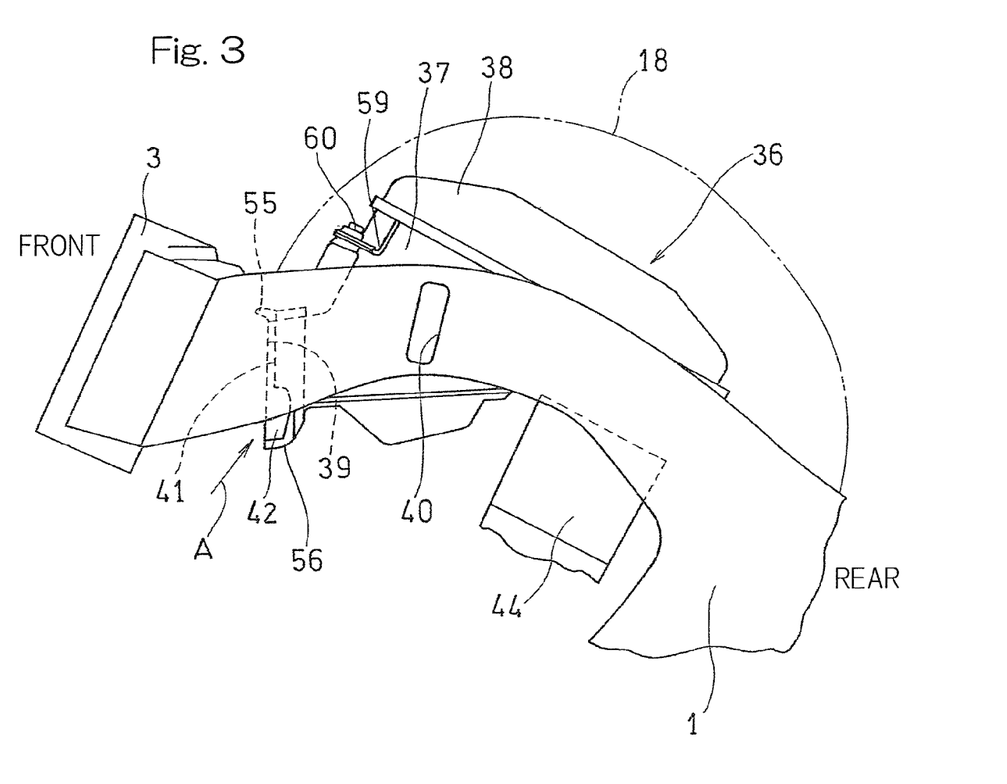
FIG. 3 is a schematic fragmentary side view showing, on an enlarged scale, the air intake device and its vicinity.

FIG. 3 illustrates a schematic side view showing an air intake device and its neighborhood. As shown in FIG. 3, at an intermediate portion of the front portion of the main frame 1, which intermediate portion lies with respect to a motorcycle widthwise direction, an intake air discharge port 39 opens rearwardly. Intake air introducing ports 40 are opened in opposite side faces of the main frame 1. The main frame 1 has a hollow in which an introducing passage 43 is formed for introducing an incoming wind, which is captured as an engine intake air A through the intake air introducing ports 40 shown in FIG. 2, forwardly to the intake air discharge port 39.

The air cleaner 36 has a main intake port 41, best shown in FIG. 3, which is fluid connected with the intake air discharge port 39 in the main frame 1 via a connecting ring 50. In continuation to a lower portion of the main intake port 41, a sub intake port 42 for capturing an additional air protrudes downwardly from the air cleaner 36 and is exposed to the outside of the main intake port 41. The air cleaner 36 includes a lower casing 37 and a covering 38 for covering an upper portion of the lower casing 37. Each of the lower casing 37 and the covering 38 is made of a resinous material.

Figure 4:
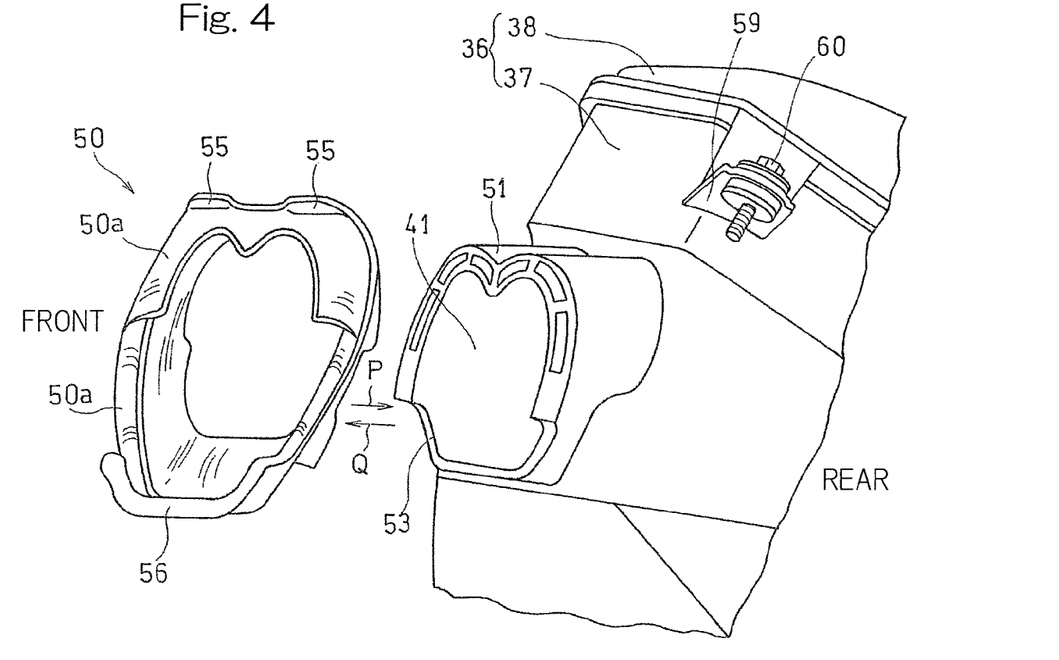
FIG. 4 is a perspective view showing the air intake device with a connecting ring removed from an intake duct tip end of an air cleaner.

FIG. 4 illustrates a condition in which the connecting ring 50 is removed from a tip end of an intake duct 51 of the air cleaner 36. As shown in FIG. 4, the main intake port 41 of the air cleaner 36 is formed in a tip end of the intake duct 51, and the connecting ring 50 is mounted on the intake duct 51 by inserting the former in a direction shown by the arrow P. The connecting ring 50 can be separated from the intake duct 51, during the maintenance, by pulling the connecting ring 50 in a direction shown by the arrow Q. The shape of the main intake port 41 of the intake duct 51 substantially coincides with the shape of the intake air discharge port 39 defined in the intermediate portion of the front portion of the main frame 1, shown in FIG. 6, with respect to the motorcycle widthwise direction. The intake duct 51, shown in FIG. 4, has a peripheral wall in which a lower portion of the tip end is cut out to form a cutout portion 53.

The connecting ring 50 is made of an elastic material such as, for example, rubber material and has an exterior shape sufficient to cover a tip end portion of the peripheral wall of the intake duct 51. The connecting ring 50 is somewhat undersized as compared with a peripheral wall dimension of the intake duct 51 so that, when the connecting ring 50 is inserted into the peripheral wall of the intake duct 51 in the direction of the arrow P, the connecting ring 50 can be elastically supported with no gap formed between the connecting ring 50 and the intake duct 51. In this way, by the connecting ring 50, the main intake port 41 of the intake duct 51 and the cutout portion 53 are covered from an outer peripheral side. A pair of left and right pawls 55 and 55 are formed in an upper side of the connecting ring 50. Also, the connecting ring 50 has a lower portion formed with a guide portion 56 so as to protrude downwardly. The connecting ring 50 has a front face 50a which serves as a sealing face.

Figure 5:
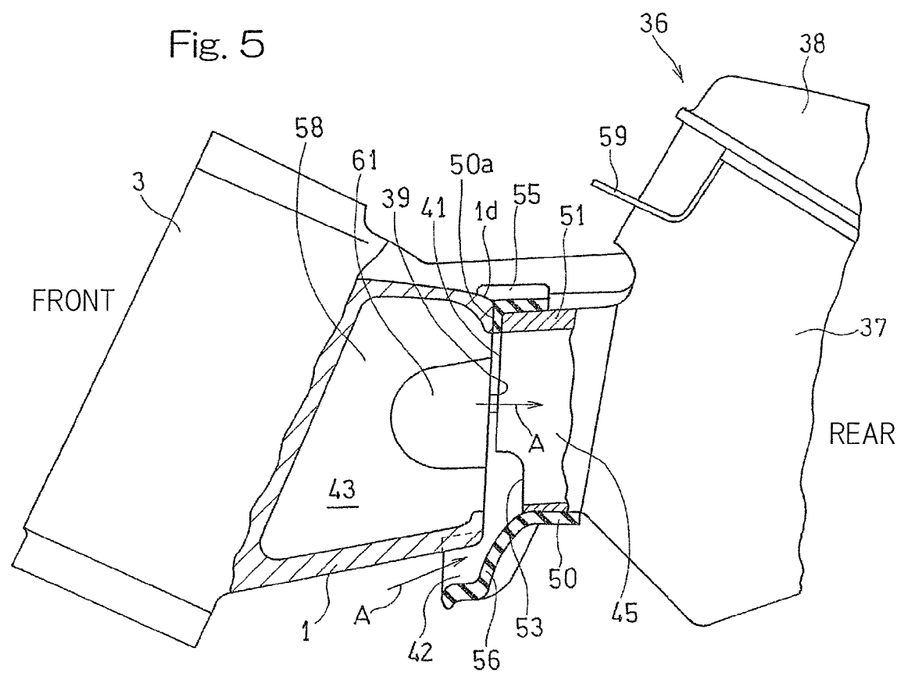
FIG. 5 is a schematic longitudinal sectional view showing a connection between an intake duct of the air cleaner and a main frame.

FIG. 5 is a longitudinal sectional view showing a condition of connection between the intake duct 51 of the air cleaner 36 and the main frame 1. The front face 50a of the connecting ring 50 is brought into contact under pressure with a peripheral edge portion of the intake air discharge port 39 in the main frame 1 to thereby seal a gap between the main intake port 41 and the intake air discharge port 39. While in this condition, the pawls 55 are elastically pressed against and are hence engaged with an outer wall surface 1d of an upper side of the main frame 1. The cutout portion 53 in the intake duct 51 of the air cleaner 36 and the guide portion 56 of the connecting ring 50 cooperate with each other to form the sub intake port 42 referred to previously.

Figure 6:
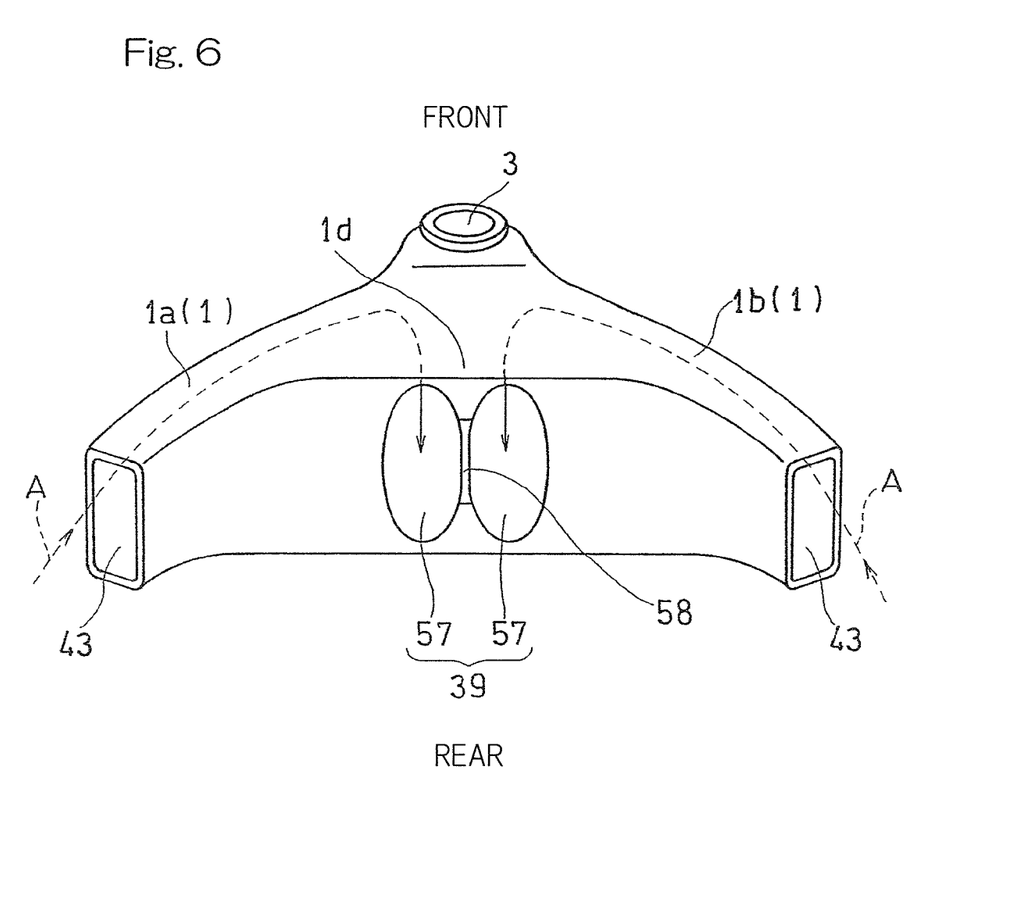
FIG. 6 is a schematic rear view of the main frame as viewed from rear.

As shown in FIG. 6, the intake discharge port 39 has a pair of left and right oval openings 57 and 57 with a partition wall 58 formed between those openings 57 and 57. The partition wall 58 is formed with a communicating port 61 best shown in FIG. 5. The intake air A having passed through the left and right introducing passages 43 within the main frame 1 is guided rearwardly by the partition wall 58 and at this time sufficiently mixed through the communicating port 61. The intake air A is then guided into the air cleaner 36 through the intake air discharge port 39 by way of the main intake port 41 in the air cleaner 36.

The air intake device of the construction as hereinbefore fully described is of such a design that, as shown in FIG. 3, the incoming air taken from the intake air introducing port 40 in the main frame 1 as an engine intake air A is introduced from the main intake port 41 of the air cleaner 36 into the air cleaner 36 that is fluid connected with the intake air discharge port 39 in the main frame 1. At this time, as shown in FIG. 2, the introducing port 40 of the introducing passage 43 referred to previously is defined in a portion of each of the main frame pieces 1a and 1b, which is situated rearwardly of the main intake port 41 of the air cleaner 36, and the intermediate portion of the front portion of the main frame with respect to the motorcycle widthwise direction is formed with the intake air discharge port 39 that is opened rearwardly and fluid connected with the main intake port 41. Therefore, the introducing passage 43 within the main frame 1 is increased in length, whereby intake air sounds are reduced.

Also, as shown in FIG. 5, since the intake air A is also introduced from the sub intake port 42 into the main intake port 41 and an in-duct air intake passage 45, the surface area of the intake port is substantially increased. Accordingly, the amount of air sucked into the air cleaner 36 is increased to thereby increase the air intake efficiency, resulting in an increase of the engine performance. Also, since the intake air A introduced from the sub intake port 42 does not flow through the introducing passage 43 within the main frame 1, the air intake resistance or pipe loss is reduced. Furthermore, since the sub intake port 42 is provided in the intake duct 51 of the air cleaner 36, the main frame 1 itself can be used with the conventional parts in the form as they are. Accordingly, the manufacturing cost can be suppressed to a low level.

Since the sub intake port 42 is disposed on a lower side of the main intake port 41, an undesirable intrusion of rain into the sub intake port 42 can be avoided. Also, with a simplified structure in which the cutout portion 53 is formed in the peripheral wall of the intake duct 51 by merely cutting, the sub intake port 42 can be formed.

In addition, merely by mounting the connecting ring 50, which is made of the elastic material, on the intake duct 51, the sub intake port 42 can be easily formed by a combination of the guide portion 56 of the connecting ring 50 and the cutout portion 53 in the intake duct 51. The air cleaner 36 and the main frame 1 are connected together by means of the connecting ring 50 made of the elastic material, and therefore, air tightness is secured, whereby upward and lateral leakage of intake sounds can be reduced.

Yet, when the front portion of the main frame 1 and the tip end of the intake duct 51 are connected together through the connecting ring 50, the connecting ring 50 is connected with the main frame 1 in a stable fashion by means of the pawls 55 in the connecting ring 50.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Main frame
1a, 1b . . . Main frame piece
1d . . . Outer wall surface
36 . . . Air cleaner
39 . . . Intake air discharge port
40 . . . Intake air introducing port
41 . . . Main intake port
42 . . . Sub intake port
43 . . . Introducing passage
50 . . . Connecting ring
51 . . . Intake duct
53 . . . Cutout portion
56 . . . Guide portion
A . . . Intake air (Engine intake air)

What is claimed is:

1. A motorcycle air intake device which comprises:
an air cleaner having a front end formed with a main intake port, the air cleaner being positioned between a pair of left and right main frame pieces forming a main frame wherein the air cleaner has a tip end having an intake duct and the main intake port is formed in the intake duct, which has a peripheral wall provided with a cutout portion, and the cutout portion is provided with a sub intake port;
an introducing passage defined within the main frame to capture an incoming wind as an engine intake air;
an intake air introducing port of the introducing passage provided in a portion of the main frame piece at a location rearwardly of the main intake port in the air cleaner; and
an intake air discharge port defined in an intermediate portion of a front portion of the main frame with respect to a motorcycle widthwise direction, the intake air discharge port being opened rearwardly and fluidly connected with the main intake port; wherein the sub intake port is provided in communication with the main intake port to introduce intake air from a location in a vicinity of the main intake port into the main intake port.

2. The motorcycle air intake device as claimed in claim 1, in which the sub intake port is disposed on a lower side of the main intake port.

3. The motorcycle air intake device as claimed in claim 1, in which:

the intake duct has a tip end portion fluid connected with the intake air discharge port through a connecting ring made of an elastic material; and the connecting ring is provided with a guide portion that protrudes downwardly and forwardly from the main intake port to introduce the intake air into the sub intake port.

4. The motorcycle air intake device as claimed in claim 3, in which the connecting ring is mounted on an outer periphery of the tip end portion of the intake duct and has a pawl portion engageable with an outer wall surface in the vicinity of the intake air discharge port in the main frame.

* * * * *